United States Patent [19]

Mahrus et al.

[11] 4,406,857

[45] Sep. 27, 1983

[54] ALLOY FOR ANTIFRICTION BEARING LAYER AND PROCESS OF FORMING AN ANTIFRICTION LAYER ON STEEL SUPPORTING STRIP

[75] Inventors: Duraid Mahrus; Antonio C. Paulos, both of Sao Paulo, Brazil

[73] Assignee: Metal Leve S.A. Industria e Comercio, Brazil

[21] Appl. No.: 304,601

[22] Filed: Sep. 22, 1981

[30] Foreign Application Priority Data

Sep. 26, 1980 [BR] Brazil ................................ 8006233

[51] Int. Cl.³ ............................ C22C 9/08; B22F 7/04
[52] U.S. Cl. ................................ 420/474; 148/11.5 Q; 148/433; 428/677; 419/7
[58] Field of Search .................. 75/156, 163, 208 CS; 420/474; 428/677; 148/11.5 P, 11.5 Q, 433

[56] References Cited

U.S. PATENT DOCUMENTS 2,460,991 2/1949 Le Brasse et al. .................. 75/163
4,336,082 6/1982 Kimura ................................ 75/156

FOREIGN PATENT DOCUMENTS 469867 12/1950 Canada .............................. 420/474
52-15416 2/1977 Japan ................................ 428/677

*Primary Examiner*—Peter K. Skiff
*Attorney, Agent, or Firm*—Steinberg & Raskin

[57] ABSTRACT

The properties of copper-tin-lead alloys are improved with respect to mechanical resistance and resistance to corrosion by the incorporation therein, in specific proportions of nickel. Antifriction layers on steel supporting strips are obtained by sintering and rolling onto steel strips metal powder particles obtained by powdering a metal alloy of 2–10% nickel, 8–27% lead, 0.5–10% tin and the balance copper.

4 Claims, 2 Drawing Figures

ALLOY FOR ANTIFRICTION BEARING LAYER AND PROCESS OF FORMING AN ANTIFRICTION LAYER ON STEEL SUPPORTING STRIP

BACKGROUND OF THE INVENTION

Bearings, particularly bearings for internal combustion engines, normally comprise a steel supporting strip on which is aggregated an antifriction layer constituted by a copper-lead-tin-base alloy commonly named "bronze" alloy.

In the known conventional manufacture of such bearings, the Cu-Pb-Sn alloy is applied and fixed on a steel supporting strip through two distinct techniques, namely, through the casting process or through the powder metallurgy process.

In the casting technique, the steel strip has its edges folded in the shape of a continuous canal, is heated at about 1,100° C. in a reducing atmosphere, passes through a melting box where the alloy, melted at a temperature of 1,200° C., is poured onto the steel strip. The strip thus lined is abruptly cooled to obtain a structure in which the lead becomes homogeneous and thinly distributed.

In the known powder metallurgy technique, which is the more flexible of the processes, it is possible to obtain strips lined with a Cu-Pb-Sn-base alloy in an ample range of compositions.

In the first stage—that of powdering—the established composition alloy is melted and, upon being poured through a small orifice, the falling metal stream is powdered by means of jets of gas or water, thereby obtaining metal powder particles, the approximately spherical shape of which can be controlled.

During the rapid cooling of each individual particle, a very thin distribution of lead is obtained through a Cu-Sn matrix. In the second stage, that of sintering, the bronze powder is deposited on a steel strip to an adequate thickness. The steel strip thus coated passes through a furnace provided with a controlled atmosphere, at temperatures between 705° and 1,000° C., and the powder particles sinter between themselves and on the steel supporting strip. In this stage, owing to thermodynamic phenomena, there is a rearrangement and a redistribution of the bronze phase and of the lead. This results in a certain distribution of the Pb phase which is not as thin as that of the particles in the original state in which they were powdered. Subsequently to the first sintering, the strip passes through rolling mill rolls, for the purpose of providing densification of the sintered particles and the total elimination of the porosities. Afterwards, the strip is sintered over again, so as to bring about the structural strengthening of the bronze which had undergone deformation during the previous step. The strip can then be rolled again for dimensional adjustment and/or increase of certain physicomechanical properties.

As a function of the redistribution of the Pb phase after the sintering stages, the antifriction layer obtained has a structure in which the Pb globules (or islands) are present in sizes which facilitate the continuity, and there may be an interconnection of the Pb globules, such as is illustrated in FIG. 1.

The perfecting of the typical sintered structures (FIG. 1) has been the object of constant research, with a view to increasing the properties of such alloys for application in bearings, such as resistance to fatigue, increase of load capacity, allied to good resistance to corrosion, and low coefficient of attrition. There is a consensus among manufacturers of bearing materials and manufacturers of motors that the thinner and more homogeneous and discontinuous the dispersion of the Pb phase in the bronze matrix, the better the performance of the bearings when used in heavy-duty motors. Similarly, it is widely accepted that the continuity of the Pb phase in the bronze matrix makes possible, for instance, the removal of the lead from the bearing alloy, by means of the chemical action of the acidity which takes place in lubricating oils when these are used for excessively long periods and at high temperatures.

SUMMARY OF THE INVENTION

It is therefore a primary object of the present invention to provide new bearing alloys of improved properties, which can be produced by powder metallurgy techniques from bronze alloys.

It is a further object of the present invention to provide new bearing alloys of Cu-Pb-Sn to which is added a specific amount of Ni, this making it possible to obtain new structures in which the lead phase present is thinner and more homogeneously distributed than in the known sintered alloys.

It is still another object of the present invention to provide a new process of forming an antifriction Cu-Sn-Pb-base layer on a steel supporting strip for obtaining composite strips employed in the manufacture of bearings through the powder metallurgy technique, so as to allow the obtention of an antifriction layer with a very thin distribution of lead which layer is highly resistant to wear and traction, without calling for operations strange to the known operations of powdering, sintering, and rolling.

DESCRIPTION OF THE DRAWINGS

A more complete appreciation of the present invention and many of the advantages thereof are clear upon consideration of the accompanying drawings in which.

DESCRIPTION OF THE PREFERRED EMBODIMENTS

Figure 1:
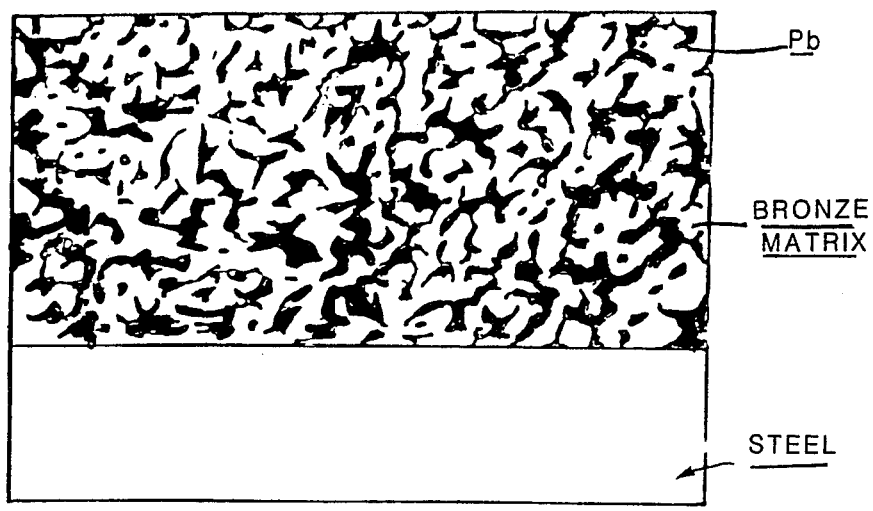
FIG. 1 illustrates the interconnection of Pb globules or islands in known Cu-Pb-Sn alloys.
Figure 2:
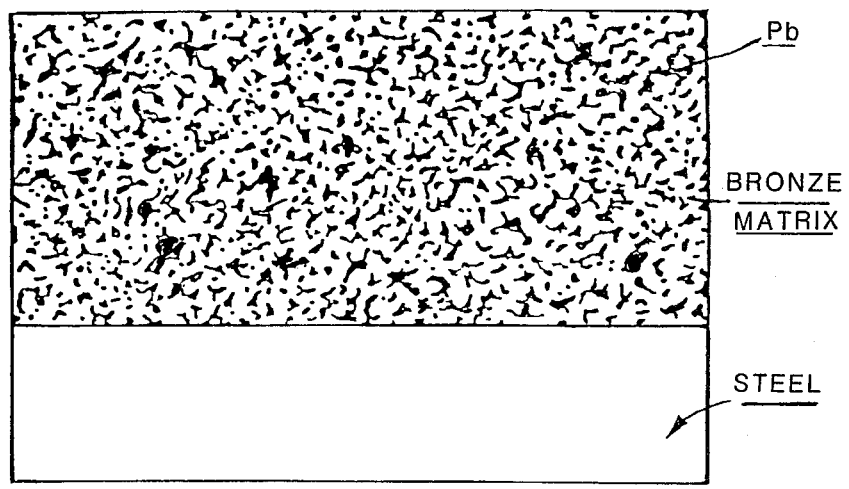
FIG. 2 illustrates the thinner distribution of the Pb phase in the Cu-Pb-Sn-Ni alloys of the present invention.

FIG. 1 represents an enlarged crosscut of a composite strip, including a steel supporting strip and an antifriction layer obtained by the sintering of particles of the known Cu-Sn-Pb alloy; and FIG. 2 is a view similar to FIG. 1, illustrating the antifriction layer obtained by the sintering of particles of the new alloy which is the object of the present invention.

According to the present invention, a new alloy is provided with the addition of a determined nickel (Ni) content to the known copper-tin-lead alloy when the latter is still in the molten state, before it is powdered, for the production of the metal powder particles to be subsequently sintered on a steel supporting strip.

By means of this Ni addition it is possible to alter the thermodynamic sintering characteristics of the Cu-Sn-Pb alloys, making possible the obtention of new and better structures for such alloys in the form of an antifriction bearing layer in which the Pb phase is made thinner and more homogeneously distributed and discontinuous, as can be seen from FIG. 2.

A further advantage of the Ni addition to the traditional Cu-Pb-Sn bearing alloys obtained by sintering is that the powders containing such chemical element (Ni) can be sintered at temperatures lower than the usual temperatures and at higher operational speeds. The Ni favors the diffusion phenomenon and thus brings about an economy in the process.

With the structure illustrated in FIG. 2, in addition to the lead islands being present with a thinner and more discontinuous distribution, the bronze (Cu-Sn-Ni) matrix is present with a greater mechanical resistance owing to the presence of the nickel.

Despite the fact that the use of nickel in the copper (cupronickels) is already known for the purpose of improving the physico-mechanical properties, such as hardness and tensile strength, it must be made clear that the nickel addition according to the invention aims specifically at preventing or minimizing the agglomeration of the lead globules during the operations of sintering of the Cu-Sn-Pb alloy powders, the increase in the mechanical resistance obtained by the addition of the element nickel being considered as marginal and secondary.

The alloy of the present invention for achieving the objects thereof contains the constituent elements in the following proportions:

Pb—8–27%
Sn—0.5–10%
Ni—2–10%
Cu—Balance

It is known that in the manufacture of materials for bearings which support high revolution shafts, alloys are used with high Pb content and low Sn content, whereas in applications where the shafts operate in low revolution and under high specific load, alloys are used with low Pb content and high Sn content. Thus, the choice of the content of the above-mentioned metallic elements is a function of the specific use of the bearing.

The table below illustrates by way of example the comparisons in properties between known Cu-Pb-Sn alloys and the alloys of the present invention which also contain Ni.

| Chemical composition of the alloy (percent in weight) | | | | Hardness (Rockwell) (15-T) | Tensile strength (kg/mm$^2$) | Resistance to wear[1] (mm/10,000 cycles) | Resistance corrosion[2] (mg/cm$^2$) |
|---|---|---|---|---|---|---|---|
| Pb | Sn | Ni | Cu | | | | |
| 24 | 2 | 2 | 74 | 72 | 19.1 | 0.0048 | 0.18 |
| 22 | 2 | 2 | 74 | 73 | 21.8 | 0.0039 | 0.08 |
| 20 | 2 | 4 | 74 | 75 | 22.5 | 0.0027 | 0.08 |

Note:
The values shown in the table represent the average of the values obtained in various experiments.
[1]Indicates the wear depth in 10,000 cycle tests.
[2]Loss of specific mass (mg/cm$^2$) verified in tests at 120° C., after 5 hours, in a mineral oil solution with 10% oleic acid.

According to the values shown in the table, it is clear that the Cu-Pb-Sn alloys with Ni addition present a resistance to corrosion more than two times greater than that of alloys without Ni.

Similarly, the Ni addition brought about advantages in the mechanical properties of the alloy (tensile strength and resistance to wear).

These sintered materials have made possible the obtention of structures with a phase distribution highly desirable for application in bearings of heavy-duty motors. In these structures, the Pb phase appeared favorably dispersed in the Cu-Sn-Ni matrix, as desired.

EXAMPLE

An alloy of 22% by weight lead, 2% by weight tin, and 54% by weight copper is molten to a temperature of about 1200° C., and 2% nickel is added thereto. The molten alloy is powdered in conventional manner by pouring the same through a small orifice with jets of gas directed thereagainst.

The resulting powder is deposited on a steel strip and passed through a furnace at a temperature of about 1,000° C. to sinter the particles to themselves and to the steel strip. This strip is then passed through rolling mills and again sintered.

The resulting alloy has the properties set forth in the table herein.

It is apparent that variations in the compositions set forth herein and in the table permit the adaption of any composition according to the needs of any bearing application so that the compositions shown in the table are for example purposes and do not set any bounds as to the scope of the present invention.

What is claimed is:

1. Powdered Cu-Sn-Pb alloy having increased mechanical properties and in which the agglomeration of lead globules upon sintering is prevented and corrosion resistance is increased so that said alloy is particularly suitable for antifriction bearings, said alloy consisting essentially of 2–10% by weight nickel, 8–27% by weight lead, 0.5–10% by weight tin, and the balance copper.

2. Method of producing the alloy of claim 1, which comprises adding said nickel to a molten alloy containing said copper, tin and lead to form a molten combined alloy, and powdering said molten combined alloy to form a powdered alloy suitable for antifriction bearing layers.

3. Antifriction bearing material, comprising a steel supporting strip having sintered thereon a layer of powdered particles of an alloy consisting essentially of 2–10% by weight nickel, 8–27% by weight lead, 0.5–10% by weight tin, and the balance copper, said sintered layer having a thin, homogeneously distributed discontinuous lead phase so that the copper, tin and nickel forms a matrix with improved mechanical properties and corrosion resistance.

4. Method of producing an antifriction bearing material, which comprises applying onto a steel supporting strip a layer of powdered Cu-Sn-Pb alloy having increased mechanical properties and in which the agglomeration of lead globules upon sintering is prevented and corrosion resistance is increased so that said alloy is particularly suitable for antifriction bearings, said alloy consisting essentially of 2–10% by weight nickel, 8–27% by weight lead, 0.5–10% by weight tin and the balance copper, sintering said powdered layer on said steel supporting strip at a temperature sufficiently high to sinter the particles to themselves and to the steel strip, subjecting the thus obtained steel strip having said sintered particles thereon to rolling, and again sintering the same, thereby obtaining an anti-friction bearing material having a homogeneously distributed discontinuous lead phase in the sintered layer.

* * * * *